April 6, 1971  B. A. BANKS  3,573,977

PROCESS FOR GLASS COATING AN ION ACCELERATOR GRID

Filed Sept. 19, 1968

INVENTOR
BRUCE A. BANKS

BY

ATTORNEYS

United States Patent Office 3,573,977
Patented Apr. 6, 1971

3,573,977
PROCESS FOR GLASS COATING AN ION ACCELERATOR GRID
Bruce A. Banks, North Olmsted, Ohio, assignor to the United States of America as represented by the Administrator of the National Aeronautics and Space Administration
Filed Sept. 19, 1968, Ser. No. 760,928
Int. Cl. C23d 5/04, 7/00
U.S. Cl. 117—224                                    5 Claims

---

ABSTRACT OF THE DISCLOSURE

Minimizing bubbles in a fused glass coating on a perforated plate forming the single grid of an ion thrustor accelerator system. A slurry coated grid is first heated in a helium atmosphere which is subsequently changed to argon so that entrapped helium diffuses out of the glass.

---

STATEMENT OF GOVERNMENT OWNERSHIP

The invention described herein was made by an employee of the United States Government and may be manufactured and used by or for the Government for governmental purposes without the payment of any royalties thereon or therefor.

BACKGROUND OF THE INVENTION

This invention is concerned with improving the insulating coating on a single grid accelerator system in an ion thrustor. The invention is particularly directed to increasing the effective electrical breakdown strength of such a coating.

Single grid accelerator systems have been utilized with ion thrustors to solve certain problems encountered in conventional systems having two spaced grids. One such system has a dielectric material interposed between the accelerator grid and the thrustor ionization chamber for protecting the grid against direct ion impingement as described in U.S. patent application Ser. No. 758,540 and now Pat. No. 3,443,376. The ion extraction capability of such a single grid system is improved by utilizing a glass coated grid as described in U.S. patent application Ser No. 758,390 and now abandoned. Certain problems have been encountered while such a grid is being coated with glass in that environment gas is encapsulated by the glass particles resulting in small gas filled bubbles trapped in the fused glass coating. When a high electrical potential is imposed across the coating, the bubbles become potential electrical breakdown sites. If an electrical discharge occurs within a bubble, the conductivity of the plasma in the bubble reduces the effective breakdown strength of the coating in a line through the bubble. Thus, either relatively large bubbles or a multiplicity of smaller bubbles can significantly reduce the effective electrical breakdown strength of the coating.

These problems have been solved by coating the metal grid in accordance with the present invention. A powdered glass and water slurry is sprayed onto the metal grid. The sprayed-on slurry coating is fused first in helium and then in an environment having a very low helium partial pressure.

It is, therefore, an object of the present invention to provide an accelerator grid having a bubble free glass coating with an improved electrical breakdown strength.

Another object of the invention is to provide a process for fusing glass onto the surface of an ion thrustor accelerator grid to provide a glass coating having improved sealing and bonding properties at high temperatures.

These and other objects of the invention will be apparent from the specification which follows and from the drawings wherein like numerals are used throughout to identify like parts.

DESCRIPTION OF THE PREFERRED EMBODIMENT

In an electron bombardment ion thrustor of the type described in U.S. Pat. No. 3,156,090, mercury vapor is fed into an ionization chamber through a distributor plate. Mercury atoms are bombarded by electrons emitted from a cathode in the chamber to ionoize this propellant. High electric fields in an accelerator system at the opposite end of the thrustor accelerate ions in the near vicinity through openings in an accelerator grid. Thrust is produced as these ions accelerate through this grid.

Figure 1:
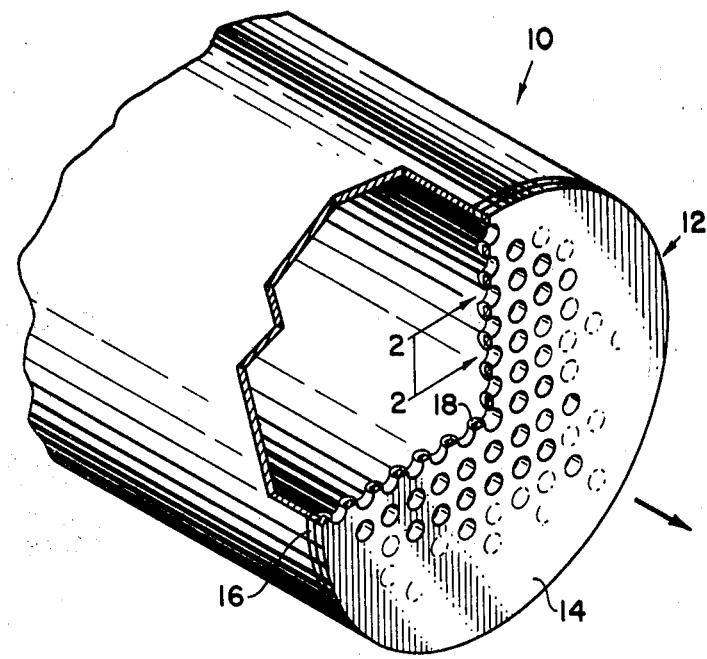
FIG. 1 is an isometric view with parts broken away of an ion thrustor having a single grid accelerator system constructed in accordance with the present invention.

Referring now to the drawing an ion thrustor is shown in FIG. 1 which has an ionization chamber 10 for containing an ionized propellant. This propellant may be mercury that is ionized by electron bombardment as described in the aforementioned U.S. Pat. No. 3,156,090.

Figure 2:
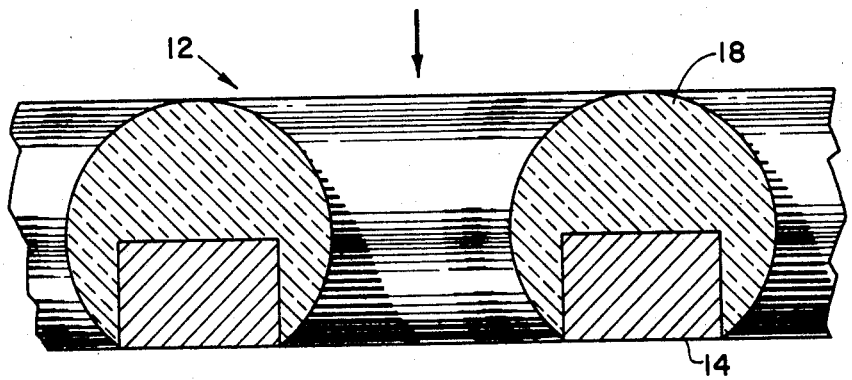
FIG. 2 is an enlarged sectional view taken along the line 2—2 in FIG. 1.

The ion thrustor further includes an accelerator system 12 constructed in accordance with the present invention for accelerating propellant ions in the direction of the arrows in FIGS. 1 and 2. The accelerator system 12 utilizes a single grid 14 of an electrically conducting material. An electrical power source impresses a potential on the grid 14 that is highly negative relative to the ionization chamber 10. The grid 14 is electrically conductive to establish the proper electrostatic field for accelerating the ions in the chamber 10.

An insulator 16 serves to electrically isolate the electrically conductive grid 14 from the metal housing forming the ionization chamber 10. The insulator 16 has an annular configuration and extends about the periphery of the ionization chamber 10.

The accelerator system in a conventional ion thrustor of the type described in U.S. Pat. No. 3,156,090 has both a screen grid and an accelerator grid. The screen grid serves to contain the discharge plasma in the ionization chamber while forming the necessary ion optics to prevent direct impingement of accelerated ions on the accelerator grid. A plasma sheath is formed near the upstream surface of the screen grid.

According to the present invention a glass coating 18 is bonded to the electrically conducting grid 14 as shown in FIGS. 1 and 2. The plasma sheath is believed formed near the upstream surface of the glass coating 18. Because of the high electrical resistance of the glass, charges can build up on its surface to form a virtual screen grid. In this manner the plasma sheath is moved closer to the negative accelerator grid 14. This increases the field strength for a given voltage which, in turn, increases the ion beam current density.

The fused glass coating 18 is obtained by spraying a slurry onto the metal grid 14. This slurry is prepared by suspending finely milled particles of glass in a solution of water or some other organic or inorganic solvent. This slurry covers one face and the walls of the holes in a perforated plate forming the grid 14. The surfaces of the perforated plate to be coated are initially oxidized prior to being covered with the sprayed slurry.

The glass used in the bonded coating 18 is of a type that forms a good seal with the material of the grid 14. Corning glass 7052 has been found to be satisfactory for coating a molybdenum grid. Corning glass 7052 is a borosilicate glass having a nominal composition of about 80% silica, 14% boric oxide, 4% soda, and 2% alumina.

According to the present invention the sprayed metal grid is dried in air to remove the water. The powdered glass and grid are then heated in an inert atmosphere of helium gas to fuse the glass. During this time helium bubbles are formed in the glass.

The helium atmosphere is then changed to an argon atmosphere to provide an environment with zero helium partial pressure. The entrapped helium diffuses out of the glass and the bubbles collapse. This results in a nearly bubble-free coating with a substantially enhanced electrical breakdown strength.

By way of example, a 0.3 mm. thick Corning glass 7052 coating was fused to one side of a 0.5 mm. thick perforated molybdenum sheet. This was accomplished by first spraying a slurry prepared in the aforementioned manner onto the molybdenum sheet. The environment was purged after drying, and both the glass and grid were heated in a helium gas atmosphere at 1170° C., for approximately 5 minutes. The helium environment was then removed, and argon gas was substituted. The grid was maintained at the elevated temperature for an additional 15 minutes to enable trapped helium to diffuse out of the bubbles which collapse. The result after cooling was a nearly bubble-free coating.

It was found that the effective breakdown strength of a coating prepared in accordance with the invention was increased over eight times by eliminating the bubbles. By way of example the effective breakdown strength of coatings made by the helium diffusion process was $8.75 \times 10^7$ volts per meter for coatings approximately 0.035 cm. thick.

While the preferred embodiment of the invention has been shown and described it will be appreciated that various modifications may be made to the disclosed process without departing from the spirit of the invention or the scope of the subjoined claims.

What is claimed is:

1. A method of coating a plate for a single grid accelerator system in an ion thrustor for protecting the same from direct ion impingement comprising the steps of suspending fine particles of a borosilicate glass in a liquid to form a slurry, spraying said slurry onto said plate to form a coating thereon, heating said coating in a helium atmosphere to fuse said glass particle onto the surface of said plate thereby entrapping helium in bubbles in said glass, displacing said helium atmosphere with an inert atmosphere having a low helium partial pressure whereby said entrapped helium in said bubbles diffuses out of said glass and said bubbles collapse thereby enhancing the electrical breakdown strength of said coating, and cooling said plate with said glass coating thereon to ambient temperature.

2. A method of coating a plate as claimed in claim 1 wherein said plate is perforated, and the surfaces of said perforated plate to be coated are initially oxidized prior to being sprayed with said slurry.

3. A method of coating a plate as claimed in claim 2 wherein the slurry is sprayed onto those surfaces of the perforated plate to be protected from direct ion impingement.

4. A method of coating a plate as claimed in claim 3 wherein the sprayed slurry is dried onto said surfaces of said perforated plate prior to heating said coating to fuse said glass.

5. A method of coating a plate as claimed in claim 4 wherein the helium atmosphere is displaced with an argon atmosphere.

References Cited
UNITED STATES PATENTS 3,015,032   12/1961   Hoyer et al. _____ 250—84.5

WILLIAM L. JARVIS, Primary Examiner

U.S. Cl. X.R.

117—125, 98; 60—202; 65—60